United States Patent Office 3,268,614
Patented August 23, 1966

3,268,614
RECOVERING ALLENE BY SOLID
CUPROUS HALIDE
Robert B. Long, Atlantic Highlands, N.J., assignor to Esso
Research and Engineering Company, a corporation of
Delaware
No Drawing. Filed Aug. 6, 1965, Ser. No. 477,966
10 Claims. (Cl. 260—681.5)

This invention is directed to a process for recovering high purity allene from $C_3$ hydrocarbon mixtures containing allene, methylacetylene, materials capable of forming azeotropes with allene and methyl acetylene, e.g. propylene, and other hydrocarbons, e.g. propane.

More specifically, this invention is directed to essentially a two-stage process for separating allene from $C_3$ hydrocarbon mixtures containing allene, methyl acetylene, propylene, and propane by (a) contacting said $C_3$ hydrocarbon mixture with an active, porous cuprous halide sorbent having a porosity of above about 10% (of the total volume of a particle) 550–10,000 A. pores at temperatures and pressures sufficient to form cuprous halide complexes with allene and methyl acetylene, (b) subjecting said complexes to temperatures and pressure conditions such that the partial pressure of methyl acetylene and allene is below the dissociation pressure of the cuprous halide-methyl acetylene and cuprous halide-allene complexes to obtain a highly pure allene-methyl acetylene concentrate substantially free of propylene and propane and (c) fractionally distilling said concentrate to obtain allene and methyl acetylene therefrom.

When allene and methyl acetylene are produced by cracking and dehydrogenation of isobutylene, $C_4$ mixtures, $C_5$ mixtures, naphthas, or gas oils, they usually are in admixture with propylene and propane. However, both allene and methyl acetylene form minimum boiling azeotropes with propylene, which makes the recovery of pure allene by distillation alone very difficulty if not impossible. Previous attempts to recover pure allene and methyl acetylene from $C_3$ petroleum fractions have been further complicated due to a safety requirement that $C_3$ petroleum cuts containing allene and methyl acetylene in mixture with propane and propylene be handled at low temperatures to avoid explosion. Consequently, the conventional prior art separation methods usually require low temperature processing which makes recovery of pure allene and methyl acetylene even more difficult because of the extreme difficulty in separating allene and methyl acetylene from their propylene azeotropes.

The present invention by allowing the recovery of a pure allene-methyl acetylene concentrate essentially free from azeotrope formers and other impurities, e.g. propylene and propane enables fractional distillation to be employed because this invention avoids azeotropes and is feasible and safe. Consequently, the present invention offers a very attractive method to recover pure allene and methyl acetylene. As mentioned previously, prior to the present invention, there was no satisfactory way of attaining a pure allene-methyl acetylene concentrate essentially free from propane and propylene so that fractional distillation could not be employed successfully to recover pure allene and pure methyl acetylene.

As mentioned hereinabove, the first stage (a) of the process of this invention, viz. sorption, involves contacting the $C_3$ hydrocarbon mixture comprised chiefly of allene, methyl acetylene, propylene and propane with an active porous cuprous halide sorbent having a porosity of above about 10% (of the total of the particles) 550 to 10,000 A. pores. This contact is conducted either in the vapor or liquid phase at temperatures and pressures sufficient to allow formation of the cuprous halide-allene and cuprous halide-methyl acetylene complexes. The first step involves formation of the respective complexes by contacting the said $C_3$ hydrocarbon mixture containing allene, methyl acetylene, propylene, and propane with the active sorbent at temperatures which can range from about −50 to 40° C., usually from −30 to 30° C., and preferably from about −15° C. to 20° C. (followed by thermal decomplexation of the complexes usually at higher temperatures than those employed to form the complexes). Propane (and other paraffinic hydrocarbons present) are not sorbed and pass through the sorbent. When the sorption is conducted in the vapor phase according to a preferred embodiment of this invention, the active cuprous halide sorbents, esp. active cuprous chloride sorbents having the requisite porosity as mentioned above, preferentially complex with allene, methyl acetylene, and propylene, respectively, in that order. Vapor phase sorption is usually conducted at temperatures within about 17° C. of the dew point of the $C_3$ hydrocarbon mixture, and preferably within 12° C. of the dew point to enhance preferential complexing. Best results are secured in vapor phase sorption at temperatures within about 6° C. of the dew point.

The sorption stage can also be conducted in the liquid phase. When liquid phase complexing is used, some or even a substantial portion of the cuprous halide sorbent can be raw cuprous halide, e.g. cuprous chloride, salt, viz. cuprous halide salt which is comparatively inactive as a sorbent due to low porosity. In liquid phase sorption, the liquid $C_3$ hydrocarbon mixture (containing allene and methyl acetylene) is usually contacted with less than the stoichiometric amount, e.g. from 50 to 95% of the stoichiometric amount, of cuprous halide for a time sufficient to form a complex with the compounds having lower dissociation pressure, viz., allene and methyl acetylene. The driving force is greater for these compounds, and therefore they are picked up selectively. Allene is picked up (sorbed) first and then methyl acetylene is sorbed.

Following sorption, the loaded cuprous halide sorbent is desorbed, viz. stage (b), to release the sorbed allene-methylacetylene concentrate therefrom. Uusually this desorption (decomplexing) is conducted thermally at temperature higher than those used for complexing. During the thermal decomplexation (desorption), the pressure is reduced below the dissociation pressures of the complex, or the temperature is increased above the dissociation temperatures for the sorbed complexes whereby the complexes dissociate releasing a pure allene-methyl acetylene concentrate, which is essentially free of propylene and propane. Thus the complex particles are subjected to temperature and pressure conditions such that the partial pressure of the methyl acetylene and allene are above the dissociation pressure of the cuprous halide-methyl acetylene and cuprous halide-allene complexes but the propylene partial pressure is below the dissociation pressure of the cuprous halide-propylene complex thereby obtaining a highly pure allene-methyl acetylene concentrate free of propylenes. The propane or other saturated hydrocarbon component(s) of the feed mixture of the present process is not complexed with the active cuprous halide sorbent; therefore, it passes through the sorbent unaffected and does not show up in the concentrate which is obtained by decomplexing (desorbing) the loaded sorbent. The thermal desorption phase of the initial stage of the process can be conducted by subjecting the loaded cuprous halide sorbent to temperatures ranging from about 30 to 100° C., usually about 40 to 90° C., and preferably from about 50° C. to about 80° C. Comparable operating pressures during the thermal desorption phase can vary from about 0.3 to 15 atmospheres (4.5 to 225 p.s.i.a.) usually range from about 0.6 to 10 atmospheres (9 to 150 p.s.i.a.) and preferably range from about 1 to 5 atmospheres (15 to .75 p.s.i.a.). According to a preferred embodiment of this invention (to maximize the allene content of the allene-methyl acetylene concentrate stream obtained by thermal decomplexation of the cuprous halide complexes thereof) the allene concentrate stream is partially thermally dissociated to partly refine the complex before collecting and desorbing the complex. This permits the less stable (less preferentially complexed) methyl acetylene complex to dissociate preferentially first before the allene is dissociated and results in a much higher concentration of allene (viz., 50+ to 60+ wt. percent in the allene-methyl acetylene concentrate recovered from the cuprous halide sorbent complex by the desorption procedure. This partial decomplexing can be conducted conveniently at temperatures of about 20 to 60° C. and pressures of 0.3 to 15 atmospheres (4.5 to 225 p.s.i.a.) by passing the powdered solid allene-methylacetylene-cuprous halide complex through a heated stripping column on its way to the decomplexing phase. Either hot stripping gas or heated surfaces can be employed to aid in stripping of the allene-methylacetylene complex. In accordance with the present invention, both the complexing (sorption) and decomplexing (desorption) phases can be accomplished in one or more fixed or fluidized beds of the cuprous halide sorbent particles.

While the use of the active cuprous halide sorbents, alone, aids in increasing the allene content of the pure allene-methyl acetylene concentrate, the normal proportions of allene to methyl acetylene (present in the $C_3$ hydrocarbon mixtures as obtained by the thermal cracking processes) make recovery of pure allene (free from methyl acetylene) in reasonable yields very expensive and difficult if the cuprous halide sorbent complexing-decomplexing procedure is employed, alone, to obtain pure allene. Consequently, it is an essential feature of this invention that the desorption step be followed by fractional distillation or equivalent separation procedure.

Active cuprous halide sorbents possessing the requisite porosity as defined above, esp. for use in vapor phase sorption, can be prepared in accordance with the procedure set forth in U.S. patent applications S.N. 333,925 filed by Robert B. Long and Warren A. Knarr on December 27, 1963, and S.N. 333,926 filed by Robert B. Long on December 27, 1963, the disclosure of both of these patent applications being incorporated herein by reference.

A convenient way of preparing the active cuprous halide sorbents suitable for use in accordance with this invention is to dissolve or slurry cuprous halide salt in a suitable organic or inorganic solvent at temperatures of about −40 to 10° C. to form a cuprous halide solution thereof, followed by contacting the resulting cuprous halide solution with a complexing agent capable of forming a stable copper complex having a mole ratio of copper to complexing compound greater than 1:1. Then the thus formed complex is thermally decomplexed by subjecting it to conditions of temperature and pressure such that the dissociation pressure of the cuprous halide-complexing agent complex exceeds the partial pressure of the sorbed complexing agent. Consequently, the complex decomposes thermally with release of the complexing agent (which can then be collected by conventional means) resulting in the activated cuprous halide sorbents.

Suitable cuprous halide salts for use in forming the cuprous halide sorbents in accordance with this invention include cuprous chloride, cuprous bromide, and cuprous iodide with the preferred cuprous halide salt being cuprous chloride. The purity of the cuprous halide salt is usually at least 90%. Preferably, the purity of the cuprous halide salt ranges from 90–100% and more preferably from about 97–100%. The moisture content of the cuprous halide salt at the time it is added to the solvent should usually not exceed about 2%, and more preferably not exceed about 1% (based on dry cuprous halide salts).

A wide variety of solvents can be used to form the cuprous halide solutions from which the activated sorbent is then formed by complexing and decomplexing. Suitable organic solvents that can be used include, but are not limited to, $C_4$ to $C_{12}$ monoolefins, especially $C_4$ to $C_{10}$ monoalphaolefins; refinery hydrocarbon streams containing a predominant portion of monoolefins, including Types I, II, III, IV and cyclic olefins, e.g., light fractions from steam cracked napthas; refinery hydrocarbon streams containing a predominant portion of monocyclic aromatic hydrocarbons, e.g., hydrocarbon raffinate streams, etc. Preferably, a solvent is used in which the cuprous halide-complexing agent complex is insoluble. Suitable exemplary $C_4$ to $C_{10}$ monoolefin solvents which can be used are the following: butene-1, isobutylene, pentene-1, hexene-1, heptene-1, octene-1, nonene-1, decene-1, and mixtures of any two or more of the above monoolefins with or without such optional hydrocarbon diluents as paraffins, cycloparaffins, cycloolefins, conjugated and nonconjugated multiolefins, etc. While conjugated multiolefins, e.g., conjugated diolefins, can be tolerated in small amounts in the solvent, the concentration thereof should usually be less than 1 weight percent and preferably less than about 0.5 weight percent (based on total solvent. In addition to organic solvents, such as those exemplary solvents listed hereinabove, other solvents can be used, including water, mixtures of organic and inorganic solvents, etc. A more comprehensive discussion of suitable solvents can be found in S.N. 333,925 and 333,926 referred to hereinabove.

Before the cuprous halide salt is added to the solvent, the solvent is usually cooled, e.g., to temperatures ranging from about −40 to 10° C. The cuprous halide salt is then added gradually thereto with agitation, e.g., stirring, to aid in dissolving. After the cuprous halide solution has been formed, the complexing operation is conducted. It is preferable to filter the cuprous halide solution to remove undissolved salt and insolubles therefrom prior to conducting the complexing and decomplexing operations whereby the active cuprous halide sorbent is formed.

The complexing operation is conducted conveniently by contacting the cuprous halide solution with a suitable complexing agent (ligand) capable of forming stable copper-ligand complexes having a mole ratio of copper to complexing ligand greater than 1:1. This is usually accomplished at temperatures of −20 to 50° C. Suitable complexing agents include both compounds which form only complexes having said ratios of copper to complexing compounds of greater than 1:1 and also compounds which form complexes having a ratio of 1:1 or less which, upon decomplexing, pass through a stable complex having a ratio of copper to complexing compound greater than 1:1. Thus, certain materials, e.g., diolefins, nitriles, acetylenes, carbon monoxides, etc., under ordinary conditions forming a 2:1 complex can be made to complex in ratios of copper to complexing compound of 1:1 or less. However, upon thermal dissociation, complexing material is released selectively from the bed of cuprous halide until the stable complex, viz., the complex having a copper to complexing agent ratio above 1:1, e.g., the 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein are: carbon monoxide, organic nitriles, organic compounds having an acetylene group, i.e., as present in acetylene; polyolefins, i.e., esp. diolefins, e.g., butadiene, isoprene, etc. More than one of these groups can be present in a single molecule of the complexing compound. In addition, the complexing agent can contain other functional groups so long as they do not interfere with complex formation. A more detailed disclosure of suitable complexing agents which can be employed can be found in U.S. applications S.N. 333,925, and S.N. 333,926 referred to previously hereinabove. The preferred complexing agent to form the active cuprous halide sorbents employed in this invention is butadiene.

After the cuprous halide-ligand complex is formed from the cuprous halide solution in the manner indicated hereinabove, the complex is dissociated by subjecting it to temperature and pressure conditions such that the dissociation pressure of the cuprous halide-ligand complex exceeds the partial pressure of the complexed ligand. As noted above, the complex decomposes with release of the ligand thus leaving the activated cuprous halide sorbent particles. The decomplexing is usually accomplished in the following manner. The complex, as a wet cake from a filtration-separation step, is collected in a suitable vessel. Stripping gas is then admitted to the bottom of the vessel. Heat is supplied to the vessel and/or the stripping gas, which promotes drying of the complex. As the liquid solvent is removed, the granular complex loses its cake form, and the discrete particles readily fluidize. The decomplexing to form the activated cuprous halide sorbent is then accomplished by heating as noted above. Typical decomplexation conditions are from 0.1 to 5 ft./sec. superficial vessel stripping gas velocity and temperatures of 60–100° C. (vessel temperature) at atmospheric pressure. Preferably, the decomplexation is conducted at 0.3 ft./sec. superficial vessel stripping gas velocity and temperature of 75–95° C. at atmospheric pressure.

The activated cuprous halide sorbent particles thus prepared are porous and have a characteristic porosity of at least 10% (of the total volume of a particle) being 550 to 10,000 A. pores, as determined by mercury porosimeter measurements. Usually, the active cuprous halide sorbent particles have a porosity of at least 25% (of the total volume of a particle) being 550 to 10,000 A. pores. The bulk density of these active cuprous halide sorbent particles characteristically ranges about 60 to about 90 lbs./cu. ft. (loose) and from about 65 to about 97 lbs./cu. ft. (compacted). The average particle size diameter of said active cuprous halide sorbent particles characteristically ranges from about 50—100+ microns.

The recovery of high purity allene from $C_3$ hydrocarbon mixtures containing it along with methyl acetylene, propane, and propylene is then conducted in essentially two stages as mentioned hereinabove. The first stage of the process of this invention involves contacting the above-described active cuprous halide sorbent particles, e.g., in the form of a fixed or a fluidized bed or as a slurry in a low boiling solvent, e.g. isobutylene or butene-1 with a $C_3$ hydrocarbon stream containing the components mentioned above. This contacting operation is conducted to preferentially complex allene and methyl acetylene, and avoid complexing of propylene. However, in liquid phase operation, propylene will also complex under some conditions. When this is encountered, use is made of selective dissociation of the complexes whereby propylene will be released first thereby allowing the pure methyl acetylene-allene concentrate to be secured. In accordance with this invention, and as mentioned above the complexing stage of the procedure is conducted conveniently at temperatures of from —50 C. to 40° C., at pressures of 0.3 to 15 atmospheres. Usually this complexing operation is conducted at temperatures of —30 to 30° C. and pressures of 0.6 to 10 atmospheres, and more preferably at —15 to 20° C. while utilizing pressures of 1 to 5 atmospheres.

When the allene-methyl acetylene concentrate essentially free of azeotrope formers, e.g. propylene, and other hydrocarbons, e.g. propane has been secured in the manner indicated above, this pure concentrate is then subjected to fractional distillation to obtain therefrom pure allene and pure methyl acetylene. The fractional distillation can be conducted conveniently in the following manner. The allene-methylacetylene mixture is fractionated at pressures of 1 to 10 atmospheres at the corresponding boiling points of the mixture (—25 to 35° C.) using either a batch or continuous distillation column. Depending on product purities required, the column might include 10 to 100 theoretical plates and use a reflux ratio of from 5 up to 40 to 1. The overhead product is purified allene while the bottoms is purified methyl acetylene.

In accordance with this invention, it has been observed that the separation procedures of this invention enable the attainment of allene and methyl acetylene of very high purity (90+ wt. percent and more preferably 95+ wt. percent) allene and methyl acetylene. The methyl acetylene can be recycled to a thermal cracking or other conversion unit for further conversion to allene, or it can be recovered as a chemical for use in its own right.

The present invention will be illustrated in further detail by the following examples.

*Example I*

94.2 weight parts of isobutylene solvent are placed in a glass-lined vessel provided with a centrally located agitator and chilled to —15.5° C. Then 5.8 weight parts of commercial cuprous chloride salts were added thereto and the mixture was stirred for 60 minutes at —15.5° C.

Then the cuprous halide solution thus obtained was filtered to remove insolubles therefrom using a cartridge-type fiber filter precoated with more cuprous chloride undissolved salt (insolubles) obtained from previous runs by pumping around through the filter and back to the dissolving tank repeatedly.

Following this filtration step, the clarified cuprous chloride solution, while maintained at —17.2° C., was pumped to another vessel where sufficient gaseous commercial grade butadiene to equal one stoichiometric amount (for formation of the cuprous chloride-butadiene complex) was pumped in at a gradual uniform rate using mild agitation to insure adequate contact of the butadiene with the cuprous chloride solution. An insoluble precipitate of the cuprous chloride-butadiene complex formed, and this complex was filtered, dried, decomplexed at 76.5–88° C. and pressures of one atmosphere.

The active cuprous chloride sorbent prepared as indicated above had a porosity of more than 25% (of the total volume of a particle) being 550 to 10,000 A. pores, and had an average particle size of 110 microns, approximately 50 wt. percent of the active cuprous chloride particles being of a particle size greater than 110 microns.

The thus formed porous active cuprous chloride sorbent was then contacted in the form of a fluidized bed (using the $C_3$ feed gas as the fluidization gas) with a $C_3$ petroleum cut (MAPP gas from Dow) obtained by the cracking of isobutylene and having the below indicated composition:

| Component: | Concentration, wt. percent |
|---|---|
| Allene | 32.6 |
| Methyl acetylene | 25.9 |
| Propane | 17.8 |
| Propylene | 22.6 |
| Other impurities | 1.1 |
| | 100.0 |

The contacting of reactive cuprous chloride sorbent particles with the above $C_3$ refinery stream was conducted at —10° C. and 1 atmosphere pressure (15 p.s.i.a.) for a period of 60 minutes until the cuprous halide sorbent particles were sufficiently loaded with the sorbed (complexed) components of the above stream. The gaseous stream emanating from the top of the cuprous chloride fluidized bed was enriched in propane and propylene since under the above conditions these compounds are not complexed with the active cuprous chloride particles.

The fluid bed was next stripped with $N_2$ at —5° C. to remove unreacted feed from the vapor spaces in and between particles. Then, the loaded sorbent was subjected to dissociation by heating the sorbent particles at a temperature of 80° C. and pressure of 1 atmosphere for 60 minutes. The desorbed stream coming from the top of the fluidized bed was found to have the following composition:

| Component | Desorbed Product Concentration, Wt. Percent | Hydrocarbon in N₂ Purge Gas Concentration, Wt. Percent |
|---|---|---|
| Allene | 54.6 | 28.4 |
| Methyl Acetylene | 45.0 | 70.6 |
| Propylene | 0.4 | .04 |

As will be noted from the above composition of the desorbate stream obtained by decomplexing the loaded sorbent, the desorbate stream is an essentially pure allene-methyl actylene stream (essentially free from propane, propylene, and other hydrocarbon components of the original $C_3$ feed stream). Furthermore, the $N_2$ stripping has definitely selectively removed or decomplexed methylacetylene.

This allene-methyl acetylene concentrate stream was then subjected to fractional distillation in the following manner. It was condensed at atmospheric pressure into a still pot attached to a 16 actual plate glass Oldershaw column of 1-inch diameter. The column was put on total reflux for 37 minutes. Cuts of 8 to 16 cc. were taken every half hour and analyzed by gas chromatography using a benzocellosolve column.

| Cut No. | Temperature, °C. Still Pot | Temperature, °C. Reflux | Volume, cc. of Cut | Analysis of Cuts, Percent Allene | Analysis of Cuts, Percent Methyl Acetylene | Analysis of Cuts, Percent Propylene | Analysis of Cuts, Percent Propane |
|---|---|---|---|---|---|---|---|
| 1 | −23.5 | −34 | 2.5 | 92.1 | 3.7 | 3.7 | 0.5 |
| 2 | −22 | −31 | 14 | 89.2 | 9.3 | 1.4 | 0.2 |
| 3 | −21 | −32 | 10 | 89.2 | 10.0 | 0.9 | 0.01 |
| 4 | −18 | −30 | 16 | 75.0 | 25.0 | 0.02 | 0.01 |
| 5 | −17 | −25 | 13 | 64.0 | 36.0 | 0.02 | |
| 6 | −15 | −25 | 8 | 20.7 | 79.3 | | |
| Bottoms | | | 38 | 4.4 | 95.6 | | |

The advantageous nature of the recovery of high purity allene by the combined cuprous halide sorption-desorption followed by fractional distillation in accordance with this invention can be readily seen from the above example.

*Example II*

Another run was conducted using the same feed, reactor and operating conditions as in Example I. However in this case the nitrogen stripping was maintained for a longer period of time. The loaded sorbent was then decomplexed in the same manner as in Example I. The desorbed hydrocarbons were found to have the following compositions.

| Component | Desorbed Product Concentration, Wt. Percent | Hydrocarbon in N₂ Purge Gas Concentration, Wt. Percent |
|---|---|---|
| Allene | 63.8 | 8.0 |
| Methyl Acetylene | 35.4 | 91.6 |
| Propylene | 0.7 | 0.4 |

Here, the selective dissociation of the methyl acetylene complex by the $N_2$ purge gas is indicated even more strongly showing a corresponding enrichment of allene in the overall desorbed product.

*Example III*

Another run was conducted in the same apparatus and under the same conditions as Examples I and II except that the temperature for sorption was raised to 0° C. instead of −10° C. The product was obtained by decomplexing the solids (as in Example I) and contained 55.5% allene, 44.4% methyl acetylene, and 0.13% propylene showing that the propylene content of the allene-methylacetylene mixture can be reduced by operating at higher temperature during sorption.

What is claimed is:

1. A process for recovering allene from hydrocarbon mixtures containing allene in admixture with methyl acetylene and materials forming azeotropes with allene and methyl acetylene which comprises (a) contacting said allene-methyl acetylene containing hydrocarbon mixtures with an active, particulate cuprous halide sorbent having a porosity of above about 10% (of the total volume of a particle) 550 to 10,000 A. pores at temperatures and pressures sufficient to form cuprous halide complexes with allene and methyl acetylene; (b) subjecting said cuprous halide sorbent to temperature and pressure conditions such that the partial pressure of allene and methyl acetylene are below the dissociation pressure of said cuprous halide-allene and cuprous halide-methyl acetylene complexes to form an allene-methyl acetylene concentrate substantially free from azeotropes and (c) recovering allene from said concentrate.

2. A process as in claim 1 wherein said cuprous halide is cuprous chloride.

3. A process as in claim 1 wherein said complexes obtained in (a) are partially dissociated prior to the dissociation of (b) to obtain in (b) an allene-methyl acetylene concentrate having a predominant concentration of allene.

4. A process as in claim 1 wherein said contact of said allene-methyl acetylene containing hydrocarbon mixtures with said cuprous halide sorbent in (a) is conducted in the vapor phase at temperatures within about 17° C. of the dew point of said hydrocarbon mixtures.

5. A process as in claim 1 wherein said contact of said allene-methyl acetylene containing hydrocarbon mixtures with said cuprous halide sorbent in (a) is conducted in the liquid phase employing less than the stoichiometric amount of cuprous halide for a time sufficient to form a complex with the compound having the lower dissociation pressure.

6. A process as in claim 1 wherein allene is recovered in (c) by fractionally distilling said concentrate.

7. A process for recovering allene from hydrocarbon mixtures containing allene in admixture with methyl acetylene and materials forming azeotropes with allene and methyl acetylene, which comprises (a) contacting said allene-methyl acetylene containing hydrocarbon mixtures with an active, particulate cuprous chloride sorbent having a porosity of above about 10% (of the total volume of a particle) 550 to 10,000 A. pores at temperatures ranging from about −50 to 40° C. and pressures ranging from about 0.3 to about 15 atmospheres to form cuprous chloride complexes with allene and methyl acetylene; (b) subjecting said cuprous chloride sorbent to temperatures of about 30 to 100° C. and pressures of about 0.3 to 15 atmospheres to dissociate allene and methyl acetylene from said complexes thereby forming an allene-methyl acetylene concentrate substantially free from azeotropes and (c) fractionally distilling said concentrate to recover allene therefrom.

8. A process as in claim 7 which includes partially decomplexing the cuprous chloride complexes of (a) by subjecting them to temperatures of about 20 to 60° C. and pressures of about 0.3 to 15 atmospheres prior to the dissociation of (b) to obtain in (b) an allene-methyl acetylene concentrate having a predominant concentration of allene.

9. A process as in claim 7 wherein said contact in (a) is conducted in the vapor phase at temperatures within about 12° C. of the dew point of said hydrocarbon mixtures.

10. A process as in claim 7 wherein said contact in (a) is conducted in the liquid phase employing less than the stoichiometric amount of cuprous chloride for a time sufficient to form a complex with allene.

References Cited by the Examiner
UNITED STATES PATENTS

| | | | |
|---|---|---|---|
| 2,386,379 | 10/1945 | Wolk | 260—681.5 |
| 2,446,076 | 7/1948 | Campbell et al. | 260—681.5 |
| 2,606,938 | 8/1952 | Robinson | 260—681.5 |
| 3,206,521 | 9/1965 | Long | 260—681.5 |

DELBERT E. GANTZ, *Primary Examiner.*

G. E. SCHMITKONS, *Assistant Examiner.*